United States Patent
Kim et al.

(10) Patent No.: US 8,837,109 B2
(45) Date of Patent: Sep. 16, 2014

(54) MULTILAYER CERAMIC CAPACITOR

(71) Applicant: Samsung Electro-Mechanics Co., Ltd., Gyunggi-do (KR)

(72) Inventors: Sang Huk Kim, Gyunggi-do (KR); Hyung Joon Kim, Gyunggi-do (KR); Ju Myung Suh, Gyunggi-do (KR); Jang Ho Lee, Gyunggi-do (KR); Jun Hee Kim, Gyunggi-do (KR); Min Gon Lee, Gyunggi-do (KR)

(73) Assignee: Samsung Electro-Mechanics Co., Ltd., Suwon Gyunggi-Do (KR)

( * ) Notice: Subject to any disclaimer, the term of this patent is extended or adjusted under 35 U.S.C. 154(b) by 0 days.

(21) Appl. No.: 13/781,286

(22) Filed: Feb. 28, 2013

(65) Prior Publication Data

US 2013/0170094 A1      Jul. 4, 2013

Related U.S. Application Data

(63) Continuation of application No. 13/478,540, filed on May 23, 2012, now Pat. No. 8,400,753.

(30) Foreign Application Priority Data

May 31, 2011    (KR) .................. 10-2011-0052510

(51) Int. Cl.
| | |
|---|---|
| *H01G 4/005* | (2006.01) |
| *H01G 4/12* | (2006.01) |
| *H01G 4/01* | (2006.01) |
| *H01G 4/30* | (2006.01) |

(52) U.S. Cl.
CPC . *H01G 4/01* (2013.01); *H01G 4/12* (2013.01); *H01G 4/30* (2013.01); *H01G 4/005* (2013.01)
USPC ........................................................ 361/303

(58) Field of Classification Search
USPC .................................................. 361/303, 305
See application file for complete search history.

(56) References Cited

U.S. PATENT DOCUMENTS

| | | | |
|---|---|---|---|
| 8,400,753 B2 * | 3/2013 | Kim et al. ..................... | 361/303 |
| 2009/0128988 A1 | 5/2009 | Sohn et al. | |

FOREIGN PATENT DOCUMENTS

| | | |
|---|---|---|
| JP | 05-135990 A | 6/1993 |
| JP | 2002-299148 A | 10/2002 |

* cited by examiner

*Primary Examiner* — Eric Thomas
(74) *Attorney, Agent, or Firm* — McDermott Will & Emery LLP

(57) ABSTRACT

There is provided a multilayer ceramic capacitor, including: a multilayer body having a plurality of dielectric layers and a plurality of internal electrode layers alternately laminated; wherein each internal electrode layer has a width gradually decreases from a center thereof towards both ends thereof in a length direction; and when a width of each internal electrode layer at the ends thereof in the length direction is defined as a minimum width $L2$ and a width of a portion of a margin portion M in each dielectric layer is defined as a maximum width $M2$, the portion of the margin portion M having no internal electrode layer present thereon and corresponding to the ends of each internal electrode layer in the length direction, a ratio of $M2$ to $L2$ ($M2/L2$) ranges from 0.2 to 0.3.

7 Claims, 3 Drawing Sheets

A-A'

MULTILAYER CERAMIC CAPACITOR

CROSS-REFERENCE TO RELATED APPLICATIONS

This application is a continuation of U.S. application Ser. No. 13/478,540, filed May 23, 2012, which claims priority under 35 U.S.C. §119 on Korean Patent Application No. 10-2011-0052510, filed on May 31, 2011, the entire contents of which are incorporated herein by reference.

BACKGROUND OF THE INVENTION

1. Field of the Invention

The present invention relates to a multilayer ceramic capacitor and, more particularly, a high capacity multilayer ceramic capacitor having excellent reliability.

2. Description of the Related Art

In general, an electronic component fabricated using a ceramic material, such as a capacitor, an inductor, a piezoelectric device, a varistor, a thermistor, or the like, generally has a ceramic body made of a ceramic material, internal electrodes provided in the ceramic body, and external electrodes (that is, termination electrodes) placed on surfaces of the ceramic body so as to be connected to respective internal electrodes.

Among ceramic electronic components, a multilayer ceramic capacitor has beneficial features such as small size but high capacity, ease of mounting, and the like, and is therefore widely used as a component of mobile communications equipment such as computers, PDAs, mobile phones, and so forth.

In recent years, with the trend towards smaller sized multifunctional electronic products, electronic parts have have tended to have a smaller size and high performance. In response, high capacity multilayer ceramic capacitors having a large capacity while having a small size are required. Accordingly, a multilayer ceramic capacitor, in which thicknesses of dielectric layers and internal electrodes are decreased, such that the dielectric layers and internal electrodes are highly-multilayered, is currently being manufactured.

However, in the case in which voltages per unit thickness are higher with a decrease in a thickness of the dielectric layer, dielectric breakdown may readily occur even when low voltage is applied. In general, when voltage is applied to a multilayer ceramic capacitor, an electric field is concentrated in both ends of the internal electrode rather than the center thereof in a length direction and insulation breakdown may occur at the ends of a multilayer ceramic capacitor if the dielectric layers in the center thereof have no defects.

Specifically, in the case of a rectangular pattern wherein the ends of internal electrodes are formed in parallel to a lamination direction, a lamination distance between the ends is small and an electric field strength is increased, leading to a deterioration in insulation breakdown voltage (BDV) properties.

Meanwhile, an end portion of a withdrawal portion of an internal electrode ('internal electrode withdrawal portion') is a portion to which an external electrode is applied at a minimal coating thickness, and thus, may easily be penetrated by a plating solution. If a width of the internal electrode withdrawal portion is large while a width of a margin portion of the dielectric layer is small, the plating solution may penetrate at an interface between the internal electrode and the dielectric layer, which in turn, may cause structural defects such as cracks and ultimately increase the possibility of a deterioration in reliability. Therefore, there are limitations in the development of high capacity multilayer ceramic capacitors and the miniaturization thereof.

SUMMARY OF THE INVENTION

An aspect of the present invention provides a multilayer ceramic capacitor with high reliability, capable of realizing miniaturization and an increase in capacity of the multilayer ceramic capacitor.

According to an aspect of the present invention, there is provided a multilayer ceramic capacitor, including: a multilayer body having a plurality of dielectric layers and a plurality of internal electrode layers alternately laminated; wherein a width of internal electrode layer gradually decreases from a center thereof towards both ends thereof in a length direction; and a ratio of M2 to L2 (M2/L2) ranges from 0.2 to 0.3, wherein L2 represents a minimum width of the internal electrode layer at the ends thereof in the length direction, and M2 represents a width of a portion of a margin portion M of the dielectric layer corresponding to the ends of the internal electrode layer in the length direction, the margin portion M is defined as a portion of the dielectric layer on which the internal electrode layer is not formed in the width direction.

When the width of the portion of the margin portion corresponding to the center of the internal electrode layer in the length direction may be defined as a minimum width M1, M1 exceeds 30 μM.

An average thickness of each dielectric layer may be 0.65 μM or less.

The center of the internal electrode layer in the length direction may have a predetermined radius of curvature.

A lateral side of the internal electrode layer extending in the length direction may have an elliptical shape.

The internal electrodes may include a first internal electrode and a second internal electrode facing the first internal electrode while having a dielectric layer disposed therebetween, the first internal electrode may include a first lead drawn out to a first short side face of the multilayer body; a first front end portion opposing the first lead in the length direction; and a first lateral side to connect the first lead and the first front end portion, the second internal electrode may include a second lead drawn out to a second short side face of the multilayer body; a second front end portion opposing the second lead in the length direction; and a second lateral side to connect the second lead and the second front end portion, and a first edge, at which the first lateral side meets the first front end portion, may be arranged in a region defined by projecting the second internal electrode onto a plane, on which the first internal electrode is provided.

The multilayer ceramic capacitor may have a length and a width of 0.6±0.09 mm and 0.3±0.09 mm, respectively.

The internal electrode layers may have 200 or more lamination layers.

According to another aspect of the present invention, there is provided a multilayer ceramic capacitor, including: a first internal electrode including a first lead drawn out to a first short side face of the multilayer body, a first front end portion opposing the first lead in the length direction, and a first lateral side to connect the first lead and the first front end portion; and a second internal electrode arranged to face the first internal electrode through a dielectric layer having a thickness of 0.65 μM or less disposed therebetween, wherein, when a width of the first internal electrode at the first lead or the first front end portion is defined as L2 and a width from a position, at which the first lateral side meets the first lead or the first front end portion, to a side face of the multilayer body in a width direction is defined as M2, a ratio of M2 to L2 (M2/L2) ranges from 0.2 to 0.3.

When a width from a center of a first lateral side having a maximum width L1 of the first internal electrode to the side face of the multilayer body in the width direction may be defined as M1, M1 exceeds 30 µm.

The second internal electrode may include: a second lead drawn out to a second short side face of the multilayer body; a second front end portion opposing the second lead in the length direction; and a second lateral side to connect the second lead and the second front end portion, wherein a width of the first internal electrode may gradually decrease from a center thereof in the length direction to both ends thereof, and a first edge at which the first lateral side meets the first front end portion may be arranged in a region defined by projecting a region surrounded with the second lead, second front end portion and second lateral side of the second internal electrode, onto a plane on which the first internal electrode is provided.

The lateral side of the internal electrode layer extending in the length direction may have an elliptical shape.

The multilayer ceramic capacitor may have a length and a width of 0.6±0.09 mm and 0.3±0.09 mm, respectively The internal electrode layers may have 200 or more lamination layers.

According to another aspect of the present invention, there is provided a multilayer ceramic capacitor, including: a first internal electrode that includes a first lead drawn out to a first short side face of the multilayer body, a first front end portion opposing the first lead in the length direction, and a first lateral side to connect the first lead and the first front end portion; a second internal electrode that includes a second lead drawn out to a second short side face of the multilayer body, a second front end portion opposing the second lead in the length direction, and a second lateral side to connect the second lead and the second front end portion; and a dielectric layer that is disposed between the first internal electrode and the second internal electrode and has a thickness of 0.65 µm or less, wherein a width of the first internal electrode gradually decreases from the length directional center towards both ends thereof, and a first edge, at which the first lateral side meets the first front end portion, is arranged in a region defined by projecting the second internal electrode onto a plane, on which the first internal electrode is provided.

When a width of the first internal electrode at the first lead or the first front end portion may be defined as L2 and a width from a position, at which the first lateral side meets the first lead or the first front end portion, to a side face of the multilayer body in a width direction may be defined as M2, a ratio of M2 to L2 (M2/L2) may range from 0.2 to 0.3.

When a width from a center of a first lateral side having a maximum width L1 of the first internal electrode to a side face of the multilayer body in the width direction may be defined as M1, M1 exceeds 30 µm.

When a width from a center of the first lateral side having a maximum width L1 of the first internal electrode to a side face of the multilayer body in the width direction may be defined as M1, a width of the first internal electrode at the first lead or the first front end portion may be defined as L2 and a width from a position, at which the first lateral side meets the first lead or the first front end portion, to the side face of the multilayer body in the width direction may be defined as M2, M1 exceeds 30 µm and a ratio of M2 to L2 (M2/L2) may range from 0.2 to 0.3.

The multilayer ceramic capacitor may have a length and a width of 0.6±0.09 mm and 0.3±0.09 mm, respectively The internal electrode layers may have 200 or more lamination layers.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
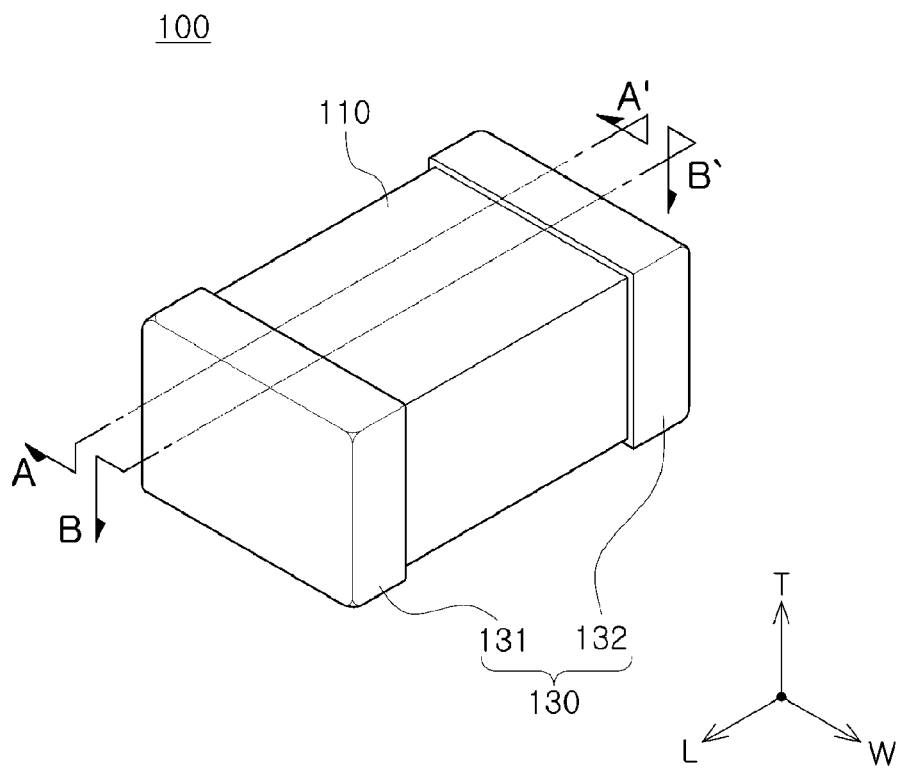
FIG. 1 is a perspective view showing an exterior of a multilayer ceramic capacitor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

In addition, components having like functions are denoted by like reference numerals throughout the drawings of each embodiment.

Figure 2:
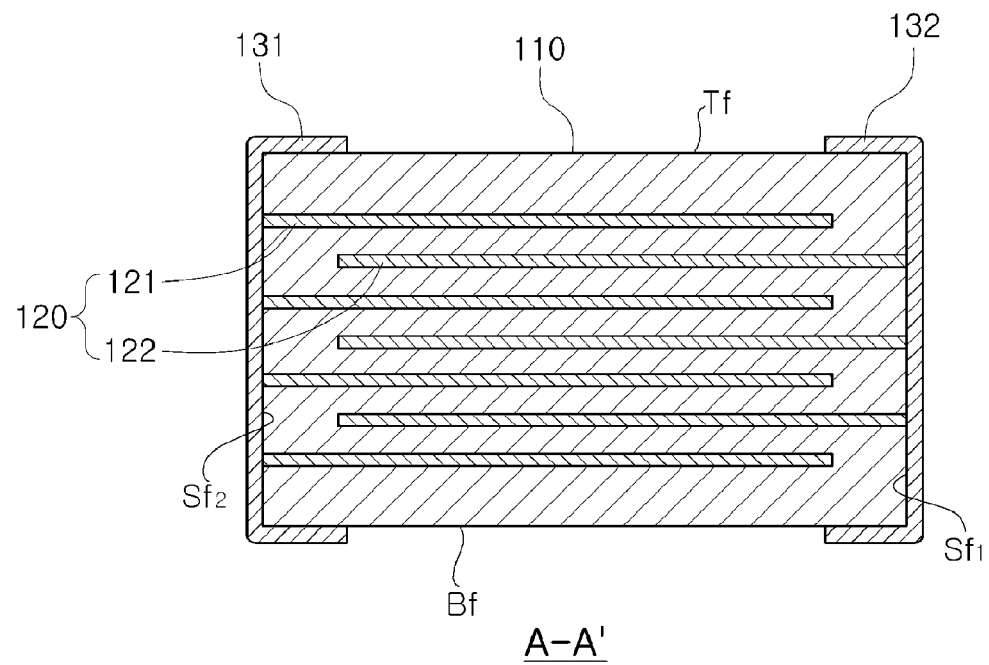
FIG. 2 is a cross-sectional view of the multilayer ceramic capacitor according to an embodiment of the present invention illustrated in FIG. 1, taken in direction A-A'.
Figure 3:
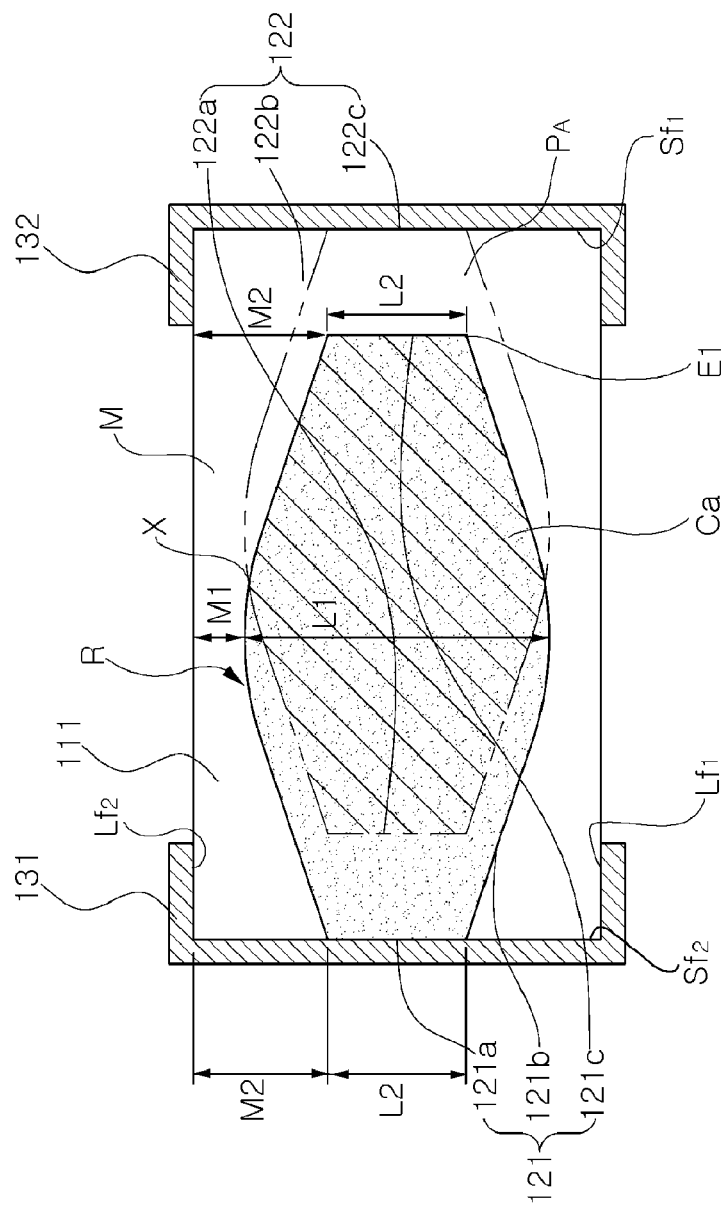
FIG. 3 is a cross-sectional view of the multilayer ceramic capacitor according to an embodiment of the present invention illustrated in FIG. 1, taken in direction B-B'.

FIG. 1 is a perspective view showing an exterior of a multilayer ceramic capacitor according to an embodiment of the present invention. FIG. 2 is a cross-sectional view of the multilayer ceramic capacitor according to an embodiment of the present invention illustrated in FIG. 1, taken in direction A-A'. FIG. 3 is a cross-sectional view of the multilayer ceramic capacitor according to an embodiment of the present invention illustrated in FIG. 1, taken in direction B-B'.

Referring to FIGS. 1 through 3, a multilayer ceramic capacitor 100 according to the present embodiment may include a multilayer body 110 and an external electrode 130.

The multilayer body 110 may have a rectangular parallelepiped shape. In embodiments of the present invention, surfaces in a lamination direction are defined as a top face Tf and a bottom face Bf, surfaces in a length direction are defined as first and second short side faces Sf1 and Sf2, and surfaces in a width direction are defined as first and second long side faces Lf1 and Lf2, respectively.

Meanwhile, with regard to the multilayer ceramic capacitor in the embodiments of the present invention, a 'length direction' may be defined as an 'L' direction shown in FIG. 1. Likewise, a 'width direction' may be defined as a 'W' direction and a 'thickness direction' may be defined as a 'T' direction. Here, the 'thickness direction' may have the same conception as a direction of stacked dielectric layers, that is, a 'lamination direction.'

The multilayer body 110 may be formed by laminating a plurality of dielectric layers in the thickness direction T. The plurality of dielectric layers constituting the multilayer body 110 may be fired and integrally formed together, such that a boundary between adjacent dielectric layers may not be distinguished.

Each dielectric layer may be formed of a ceramic powder having a high dielectric permittivity and the ceramic powder used herein may include, but is not limited to, barium titanate ($BaTiO_3$) powder, strontium titanate ($SrTiO_3$) powder, or the like.

After firing the ceramic powder to form the dielectric layers in the embodiments of the present invention, one of the plurality of dielectric layers may have a thickness of 0.65 μm or less.

In an embodiment of the present invention, the thickness of the dielectric layers may refer to an average thickness of the dielectric layer disposed between internal electrodes 121 and 122. The average thickness of the dielectric layer may be measured by image-scanning a cross-section in the length direction of the multilayer body 110 through a scanning electron microscope (SEM), as shown in FIG. 2. For instance, an average thickness may be acquired by measuring thicknesses of a dielectric layer in 30 positions in the length L direction thereof, the 30 positions being located at equal intervals, from an extracted image of the dielectric layer obtained by scanning a cross-section taken in a width-thickness direction (W-T) at the center of the multilayer body 110 in the length direction, through the SEM (magnified 10,000 times), and then averaging the values of the measured thicknesses. The 30 positions located at equal intervals may be determined on a capacity formation portion, referring to a region on which the first and second internal electrodes 121 and 122 are overlapped. In addition, in a case in which the measurement of an average value is executed with respect to 10 dielectric layers or more, the average thickness of each of the dielectric layers may be more generalized.

In addition, the thickness of the dielectric layer may be defined as an average distance between the centers of the adjacent internal electrodes 121 and 122. For instance, from an image obtained by scanning the centers of the internal electrodes 121 and 122, distances between the adjacent internal electrodes 121 and 122 in 30 positions at equal intervals in the length direction of the internal electrodes may be measured, whereby an average distance between the adjacent internal electrodes 121 and 122 may be calculated. In addition, when such a measurement of the average distance is executed with respect to 10 or more pairs of adjacent internal electrodes, the average distance between adjacent internal electrodes may be more generalized.

A plurality of internal electrodes 120 may be provided in the multilayer body 110. The internal electrodes 120 may be placed on the dielectric layers and arranged to face each other in the lamination direction of the dielectric layers, while having the dielectric layers disposed therebetween through the firing.

The plurality of internal electrodes 120 may be formed of a conductive metal, for example, Ni or an Ni Alloy. The Ni alloy may contain Mn, Cr, Co or Al, together with Ni. The internal electrodes 120 may be fabricated by printing a conductive paste containing a metal powder such as Ni or the like, onto a surface of a ceramic green sheet in a predetermined pattern. Without being particularly limited thereto, a thickness of each of the internal electrodes 120 may be 0.7 μm or less.

According to an embodiment of the present invention, 200 or more dielectric layers, or 500 or more dielectric layers, each having the internal electrodes provided thereon may be laminated.

The plurality of internal electrodes 120 may include a plurality of first internal electrodes 121 and a plurality of second internal electrodes 122, having opposing polarities. Each of first internal electrodes 121 and second internal electrodes 122 may be laminated to face each other in the lamination direction, while having the dielectric layers disposed therebetween.

As shown in FIG. 3, the first internal electrode 121 may include a first lead 121a exposed to a first short side face Sf1 of the multilayer body 110, a first lateral side 121b and a first front end portion 121c facing the first lead 121a in the length direction. Likewise, the second internal electrode 122 may include a second lead 122a exposed to a second short side face Sf2 of the multilayer body 110, a second lateral side 122b and a second front end portion 122c facing the second lead 122a in the length direction.

Therefore, the plural first internal electrodes 121 and the plural second internal electrodes 122 may be connected to the external electrode 130 at one face of the multilayer body 110. That is, the plural first internal electrodes 121 may be connected to a first external electrode 131 through the first lead 121a exposed to the first short side face Sf1, while the plural second internal electrodes 122 may be connected to a second external electrode 132 through the second lead 122a exposed to the second short side face Sf2.

A width of the first lateral side 121b of the first internal electrode 121 may gradually decrease from the length directional center to the first lead 121a and the first front end portion 121c. Likewise, a width of the second lateral side 122b of the second internal electrode 122 may gradually decrease from the length directional center to the second lead 122a and the second front end portion 122c. As a result, the plural internal electrode layers 120 may be formed to have a width gradually decreasing from the length directional center to both ends thereof, that is, the leads and front ends thereof.

According to the present embodiment, the first lateral side 121b and the second lateral side 122b may be formed to have a predetermined radius of curvature 'R' in the length directional center, and a width of the internal electrodes may gradually decrease from the center to the leads and front ends. However, the present invention is not particularly limited to the foregoing, instead, the first lateral side 121b and the second lateral side 122b may have a smoothly curved shape throughout in the length direction, for example, an elliptical shape or a diagonal shape such that a width of the internal electrode decreases from the length directional center to the lead and front end thereof.

The first front end portion 121c and the second front end portion 122c may be ends of the first and second internal electrodes 121 and 122, which are not connected to the external electrode, and may be positioned at the opposite sides of the first and second leads 121a and 122a, respectively, in the length direction. An edge, at which the first front end portion 121c meets the first lateral side 121b, and another edge, at which the second front end portion 122c meets the second lateral side 122b, may be formed to have an obtuse angle.

A first edge E1, at which the first lateral side Sf1 meets the first front end portion 121c, may be located in a region 'PA' defined by projecting the second internal electrode 122 onto a plane, on which the first internal electrode 121 is provided.

The first lead 121a and the first front end portion 121c may be formed to have the same width. Likewise, the second lead 122a and the second front end portion 122c may be formed to have the same width.

The first internal electrode 121 and the second internal electrode 122 may have a capacity formed in an overlap portion (Ca) in the lamination direction, while having the dielectric layer 111 disposed therebetween. In the overlap portion Ca, a cross-point 'X', at which lateral sides of the first internal electrode 121 and the second internal electrode cross one another, may be formed.

In the overlap portion Ca, a portion from the cross-point X to the edge, at which the first front end portion 121c meets the first lateral side 121b, among the first lateral side 121b, does not overlap the second lateral side 122b of the second internal electrode 122. Likewise, in the overlap portion Ca, a portion from the cross-point X to the edge, at which the second front end portion 122c meets the second lateral side 122b, among the second lateral side 122b, does not overlap the first lateral side 121b of the first internal electrode 121.

As such, since the edges as the portions on which the first lateral side 121b meets the first front end portion 121c and/or the second lateral side 122b meets the second front end portion 122c, are arranged in the second internal electrode 122 and/or the first internal electrode 121, an electric field may not be concentrated on the edges, thereby preventing deterioration in BDV properties.

The length directional centers of the first and second internal electrodes 121 and 122 may have the maximum width L1, while the length directional ends such as the leads or front ends may have the minimum width L2. For instance, the width of the length directional center in the first internal electrode 121 may be defined as L1 and the width of the first lead 121a or first front end portion 121c in the first internal electrode may be defined as L2.

Meanwhile, with regard to the margin portion M of the dielectric layer 111, on which the internal electrode layer 120 is not formed in the width direction, a portion of the margin portion M, which corresponds to the length directional center of the internal electrode 120, may have the minimum width M1. Also, another portion of the margin portion M, which corresponds to the length directional both ends of the internal electrode layer 120, that is, the leads or front ends thereof, may have the maximum width M2. That is, the margin portion M is defined as a portion of the dielectric layer on which the internal electrode layer is not formed in the width direction, and M2 is defined as a width of a portion of the margin portion M of the dielectric layer 111 corresponding to the ends of the internal electrode layer 120 in the length direction. For instance, a width from the center of the first lateral side 121b, at which the first internal electrode 121 has the maximum width L1, to a width directional face of the multilayer body, that is, the second long side face Lf2, may be defined as M2. Alternatively, a width from a position, at which the first lateral side 121b meets the first lead 121a or the first front end portion 121c, to the width directional face of the multilayer body, that is, the second long side face Lf2, may be defined as M2.

According to the present embodiment, the ratio of the maximum width M2 of the margin portion to the minimum width L2 of the internal electrode layer may range from 0.2 to 0.3.

In this regard, L2 indicates the minimum width of the first and second internal electrodes 121 and 122, that is, a width of the length directional both ends, for example, the leads or front ends. Also, M2 indicates the maximum width of the margin portion M, that is, a width of a portion of the margin portion M, which corresponds to the length directional end of the first or second internal electrode 121 or 122.

According to one embodiment, when a width of the first internal electrode at the first lead or the first front end portion is defined as L2 and a width from a position, on which the first lateral side meets the first lead or the first front end portion, to the width directional face of the multilayer body is defined as M2, a ratio of M2 to L2 (M2/L2) may range from 0.2 to 0.3.

If the M2/L2 is less than 0.2, deterioration may occur in a humidity resistance test, thus decreasing reliability. When the M2/L2 exceeds 0.3, that is, M2 increases, an area of the overlap portion Ca in the internal electrode may be reduced, thus causing a decrease in capacity.

According to the present embodiment, the minimum width M1 of the margin portion M may exceed 30 μm. If M1 is 30 μm or less, cutting fault may rapidly increase while shortening the width of the margin portion, which in turn, leads to a rapid increase in NG rate in a humidity resistance test, or the like, thus deteriorating reliability.

The external electrode 130 may include a first external electrode 131 and a second external electrode 132, which are arranged at both opposite sides of the multilayer body 110. As shown in FIG. 1, the first external electrode 131 may be formed to cover a first short side face Sf1 of the multilayer body 110 while the second external electrode 132 may be formed to cover a second short side face Sf2 of the multilayer body 110.

According to the present embodiment, although the first external electrode 131 and the second external electrode 132 have been formed to cover both short side faces Sf1, Sf2 of the multilayer body 110, the present invention is not particularly limited thereto. Alternatively, the first and second external electrodes 131 and 132 may be provided to cover both long side faces Lf1 and Lf2 of the multilayer body 110. In this case, the first and second internal electrodes 121 and 122 may be exposed, alternately, on both the long side faces Lf1 and Lf2 in the lamination direction, and then, connected to the first and second external electrodes 131 and 132, respectively.

The first external electrode 131 and the second external electrode 132 may be electrically isolated from each other. The first external electrode 131 may be electrically connected to one end of the first internal electrode 121 exposed to the first short side face Sf1 of the multilayer boy 110, that is, the first lead 121a, while the second external electrode 132 may be electrically connected to one end of second internal electrode 122 exposed to the second short side face Sf2, which is faced to the first short side face Sf1 of the multilayer body 110 in the length direction, that is, the second lead 122a. The external electrode 130 fabricated as described above may serve as an external terminal.

The external electrode 130 may be formed using copper (Cu) or copper alloys, or the like.

Figure 4:
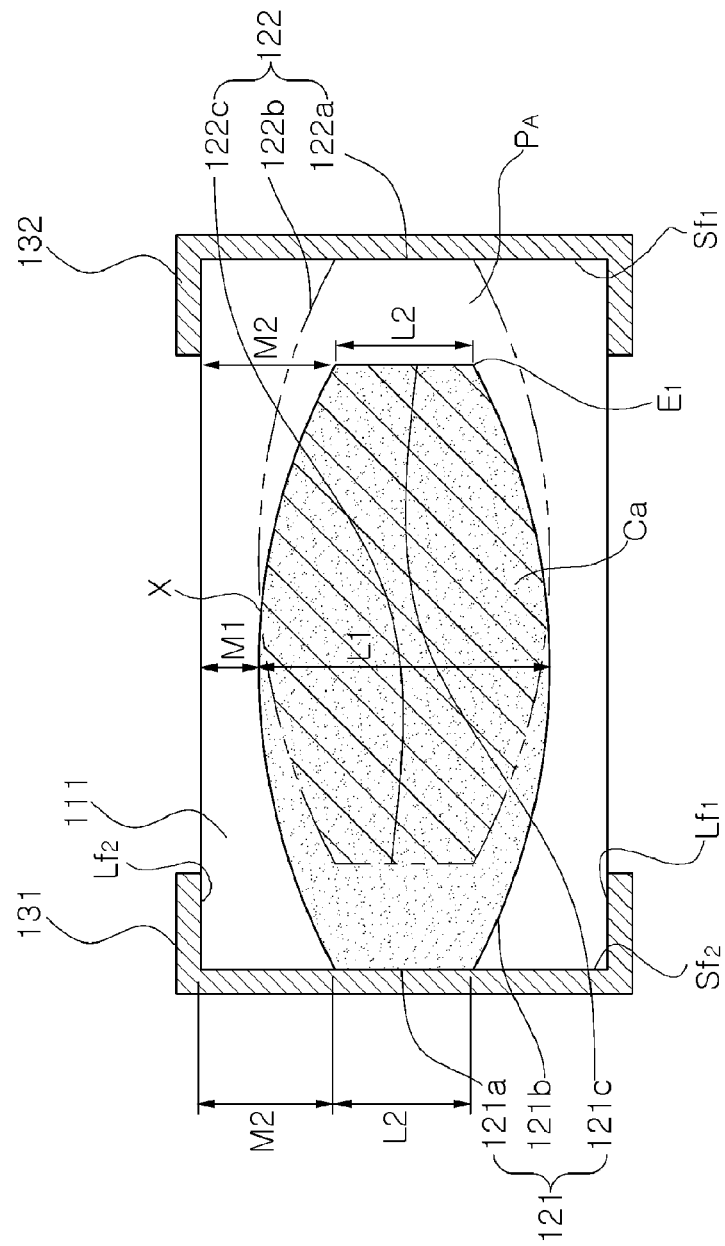
FIG. 4 is a cross-sectional view of a multilayer ceramic capacitor according to another embodiment of the present invention, taken in a length-width direction.

FIG. 4 is a cross-sectional view of a multilayer ceramic capacitor according to another embodiment of the present invention, taken in a length-width direction.

The multilayer ceramic capacitor according to another embodiment of the present invention, as shown in FIG. 4, is a modification of the internal electrode according to the previous embodiment, and technical configurations thereof are substantially the same as the multilayer ceramic capacitor according to the previous embodiment illustrated in FIGS. 1 through 3. Therefore, a detailed description thereof will be omitted, instead, differences (of the multilayer ceramic capacitor) according to another embodiment will be described below.

Referring to FIG. 4, in the multilayer ceramic capacitor according to another embodiment, a first lateral side 121b of a first internal electrode 121 and a second lateral side 122b of a second internal electrode 122 may be formed in an elliptical shape. That is, a width of the first and second internal electrodes 121 and 122 may gradually decrease in an elliptical form, from the length directional centers of the first and second internal electrodes 121 and 122 to both ends thereof, that is, the leads and front ends thereof.

The first internal electrode 121 and the second internal electrode 122 may have a capacity formed in an overlap portion (Ca) in the lamination direction, while having the dielectric layer 111 disposed therebetween. In the overlap portion Ca, a cross-point 'X', at which respective lateral sides of the first internal electrode 121 and the second internal electrode cross one another, may be formed.

In the overlap portion Ca, a portion from the cross-point X to the edge, at which the first front end portion 121c meets the first lateral side 121b, among the first lateral side 121b, does not overlap the second lateral side 122b of the second internal electrode 122. Likewise, in the overlap portion Ca, a portion from the cross-point X to the edge, at which the second front end portion 122c meets the second lateral side 122b, among the second lateral side 122b, does not overlap the first lateral side 121b of the first internal electrode 121. Therefore, an electric field may not be concentrated on the edges, thereby preventing deterioration in BDV properties.

Hereinafter, the present invention will be described in detail with reference to the following inventive example and comparative examples, however, the scope of the present invention is not limited thereto.

EXAMPLE

The multilayer ceramic capacitor according to one embodiment of the present invention was fabricated as follows.

After a slurry comprising a powder such as barium titanate ($BaTiO_3$) was applied to a carrier film, then, dried to prepare a plurality of ceramic green sheets each having a thickness of about 1.25 μm, a dielectric layer was formed using these sheets.

Next, a conductive paste for an internal electrode comprising nickel particles with an average size of 0.05 μm to 0.2 μm was prepared. By applying the above conductive paste for an internal electrode to each of the ceramic green sheets by a screen printing process, an internal electrode was formed. 200 layers of the internal electrodes were stacked to fabricate a ceramic laminate. According to the present example, the internal electrode was fabricated to have a shape illustrated in FIG. 3.

The prepared ceramic laminate was subjected to isostatic pressing at 85° C. under a pressure condition of 1000 kgf/cm².

After compression of the ceramic laminate, it was cut into separate chips. The cut chips were maintained at 230° C. for 60 hours under an atmosphere to implement debinding. Afterward, calcination was performed at 1200° C. under a reduction atmosphere as well as an oxygen partial pressure of $10^{-11}$ atm to $10^{-10}$ atm, which is lower than Ni/NiO equilibrium oxygen partial pressure, in order to prevent oxidation of the internal electrode. After calcination, an average thickness of the dielectric layer, was 1.00 μm and 0.85 μm, respectively, while an average thickness of the internal electrode layer was 0.65 μm. Each calcined chip satisfied a dimension of: 0.6 mm×0.3 mm×0.3 mm (L×W×T).

Subsequently, the above prepared chips were subjected to provision of an external electrode, plating, or the like, thereby fabricating a multilayer ceramic capacitor. The following Table 1 shows comparison results of electrical characteristics of the multilayer ceramic capacitor depending upon a ratio between the width of the internal electrode and the width of the margin portion in the multilayer ceramic capacitor, in particular; BDV properties, electrostatic capacity, cutting fault rate, NG rate in the high temperature acceleration test and NG rate in humidity resistance test.

TABLE 1

| sample | Thickness of dielectric layer after calcination | M1 (μm) | M2 (μm) | L2 (μm) | M2/L2 | Electrostatic capacity (μF) | Cutting fault rate (%) | BDV (V) | NG rate in high temperature acceleration test (%) | NG rate in humidity resistance test (%) |
|---|---|---|---|---|---|---|---|---|---|---|
| *1 | 1.00 | 40 | 40 | 220 | 0.18 | 0.89 | 0 | 96 | 0.00 | 0.00 |
| *2 | | 40 | 50 | 200 | 0.25 | 0.85 | 0 | 98 | 0.00 | 0.00 |
| *3 | | 35 | 35 | 230 | 0.15 | 0.93 | 0 | 97 | 0.00 | 0.00 |
| *4 | | 35 | 45 | 210 | 0.21 | 0.89 | 0 | 96 | 0.00 | 0.00 |
| *5 | 0.85 | 40 | 40 | 220 | 0.18 | 1.02 | 0 | 87 | 0.00 | 0.00 |
| *6 | | 40 | 50 | 200 | 0.25 | 0.97 | 0 | 89 | 0.00 | 0.00 |
| *7 | | 35 | 35 | 230 | 0.15 | 1.07 | 0 | 85 | 0.00 | 0.00 |
| *8 | | 35 | 45 | 210 | 0.21 | 0.89 | 0 | 86 | 0.00 | 0.00 |
| *9 | 0.65 | 40 | 40 | 220 | 0.18 | 1.34 | 0 | 62 | 0.25 | 0.75 |
| 10 | | 40 | 45 | 210 | 0.21 | 1.31 | 0 | 75 | 0.00 | 0.00 |
| *11 | | 40 | 50 | 200 | 0.25 | 1.28 | 0 | 79 | 0.00 | 0.00 |
| 12 | | 40 | 55 | 190 | 0.29 | 1.25 | 0 | 78 | 0.00 | 0.00 |
| *13 | | 40 | 60 | 180 | 0.33 | 1.22 | 0 | 75 | 0.00 | 0.00 |
| *14 | | 35 | 35 | 230 | 0.15 | 1.40 | 0 | 60 | 0.25 | 2.50 |
| *15 | | 35 | 40 | 220 | 0.18 | 1.37 | 0 | 74 | 0.00 | 0.25 |
| 16 | | 35 | 45 | 210 | 0.21 | 1.34 | 0 | 76 | 0.00 | 0.00 |
| 17 | | 35 | 50 | 200 | 0.25 | 1.31 | 0 | 77 | 0.00 | 0.00 |
| 18 | | 35 | 55 | 190 | 0.29 | 1.28 | 0 | 78 | 0.00 | 0.00 |
| *19 | | 35 | 60 | 180 | 0.33 | 1.25 | 0 | 77 | 0.00 | 0.00 |
| *20 | | 30 | 30 | 240 | 0.13 | 1.46 | 14.3 | 59 | 0.25 | 3.75 |
| *21 | | 30 | 35 | 230 | 0.15 | 1.43 | 12.5 | 72 | 0.00 | 2.25 |
| *22 | | 30 | 45 | 210 | 0.21 | 1.37 | 11.6 | 74 | 0.00 | 2.50 |
| *23 | | 30 | 55 | 190 | 0.29 | 1.31 | 13.2 | 76 | 0.00 | 2.75 |
| *24 | | 30 | 60 | 180 | 0.33 | 1.28 | 11.8 | 78 | 0.00 | 2.50 |
| *25 | | 20 | 20 | 260 | 0.08 | 1.58 | 23.8 | 59 | 0.50 | 8.25 |
| *26 | | 20 | 30 | 240 | 0.13 | 1.52 | 24.5 | 73 | 0.00 | 5.75 |
| *27 | | 20 | 40 | 220 | 0.18 | 1.46 | 26.3 | 72 | 0.00 | 6.00 |
| *28 | | 20 | 50 | 220 | 0.25 | 1.40 | 28.4 | 73 | 0.00 | 6.25 |
| *29 | | 20 | 60 | 180 | 0.33 | 1.34 | 22.6 | 75 | 0.00 | 5.75 |
| *30 | 0.45 | 40 | 40 | 220 | 0.18 | 2.22 | 0 | 48 | 0.50 | 1.50 |

TABLE 1-continued

| sample | Thickness of dielectric layer after calcination | M1 (μm) | M2 (μm) | L2 (μm) | M2/L2 | Electrostatic capacity (μF) | Cutting fault rate (%) | BDV (V) | NG rate in high temperature acceleration test (%) | NG rate in humidity resistance test (%) |
|---|---|---|---|---|---|---|---|---|---|---|
| 31 | | 40 | 45 | 210 | 0.21 | 2.17 | 0 | 62 | 0.00 | 0.00 |
| 32 | | 40 | 50 | 200 | 0.25 | 2.12 | 0 | 61 | 0.00 | 0.00 |
| 33 | | 40 | 55 | 190 | 0.29 | 2.07 | 0 | 59 | 0.00 | 0.00 |
| *34 | | 40 | 60 | 180 | 0.33 | 2.02 | 0 | 60 | 0.00 | 0.00 |
| *35 | | 35 | 35 | 230 | 0.15 | 2.32 | 0 | 45 | 0.50 | 5.00 |
| *36 | | 35 | 40 | 220 | 0.18 | 2.27 | 0 | 64 | 0.00 | 0.50 |
| 37 | | 35 | 45 | 210 | 0.21 | 2.22 | 0 | 63 | 0.00 | 0.00 |
| 38 | | 35 | 50 | 200 | 0.25 | 2.17 | 0 | 59 | 0.00 | 0.00 |
| 39 | | 35 | 55 | 190 | 0.29 | 2.12 | 0 | 58 | 0.00 | 0.00 |
| *40 | | 35 | 60 | 180 | 0.33 | 2.07 | 0 | 57 | 0.00 | 0.00 |
| *41 | 0.45 | 30 | 30 | 240 | 0.13 | 2.42 | 15.3 | 45 | 0.50 | 7.25 |
| *42 | | 30 | 35 | 230 | 0.15 | 2.37 | 13.6 | 62 | 0.00 | 5.00 |
| *43 | | 30 | 45 | 210 | 0.21 | 2.27 | 12.8 | 61 | 0.00 | 5.00 |
| *44 | | 30 | 55 | 190 | 0.29 | 2.17 | 14.3 | 63 | 0.00 | 5.50 |
| *45 | | 30 | 60 | 180 | 0.33 | 2.12 | 12.8 | 65 | 0.00 | 5.50 |
| *46 | | 20 | 20 | 260 | 0.08 | 2.62 | 25.2 | 47 | 0.50 | 8.25 |
| *47 | | 20 | 30 | 240 | 0.13 | 2.52 | 26.8 | 62 | 0.00 | 5.75 |
| *48 | | 20 | 40 | 220 | 0.18 | 2.42 | 28.3 | 61 | 0.00 | 12.00 |
| *49 | | 20 | 50 | 200 | 0.25 | 2.32 | 28.9 | 60 | 0.00 | 13.00 |
| *50 | | 20 | 60 | 180 | 0.33 | 2.22 | 27.5 | 62 | 0.00 | 12.50 |

*indicates Comparative Example, TABLE 2 is TABLE 1 (continued).
*M1: the minimum width of a margin portion, that is, a width of a portion of the margin portion, which corresponds to the length directional center of the internal electrode; M2: the maximum width of the margin portion, that is, a width of a portion of the margin portion, which corresponds to the length directional end of the internal electrode; L2: the minimum width of the internal electrode, that is, a width of the length directional end of the internal electrode.

From Table 1, the cutting fault rate was expressed as a percentage of fault samples, among 1000 samples per test specimen, after a cut section test was executed. Insulation breakdown voltage (BDV) properties were assessed by applying DC voltage at a rate of 10V/sec. The NG rate in the high temperature acceleration test was expressed as a percentage of samples, which showed decreased insulation resistance to $10^4 \Omega$ or less within 48 hours after applying 9.45V DC voltages at 135° C., among 400 samples per test specimen. Likewise, the NG rate in the humidity resistance test was expressed as a percentage of samples, which showed decreased insulation resistance to $10^4 \Omega$ or less within 100 hours after applying 6.3V DC voltages at 40° C. and under a relative humidity of 95%, among 400 samples per test specimen.

From Table 1, samples Nos. 1 through 4, 5 through 8, 9 through 29 and 30 through 50 showed a thickness of a dielectric layer of 1 μm, 0.85 μm, 0.65 μm and 0.45 μm, respectively, after calcinations.

First, it was found that each of the samples Nos. 1 through 8 has a dielectric show no substantial difference in capacity, BDV properties, cutting fault rate, and NG rates in high temperature acceleration test and humidity resistance test, regardless that the internal electrode has a rectangular pattern or, otherwise, an oval pattern with a difference in margins M1 and M2 of not more than 10 μm.

For the samples Nos. 9 through 50, each having a rectangular pattern or an oval pattern with a difference in margins M1 and M2 may show differences in capacity, BDV properties, cutting fault rate, and/or NG rates in high temperature acceleration test and humidity resistance test.

In particular, each of the samples Nos. 9 through 29 has a dielectric layer with a thickness of 0.65 μm. For each of the samples Nos. 9 through 13, the minimum width M1 of the margin portion is 40 μm. Likewise, each of the samples Nos. 14 through 19 has the minimum width M1 of the margin portion of 35 μm, each of the samples Nos. 20 through 24 has the minimum width M1 of the margin portion of 3 μm, and each of the samples Nos. 25 through 29 has the minimum width M1 of 20 μm.

In Table 1, the samples Nos. 9, 14, 20 and 25 have the internal electrode in a rectangular pattern. That is, the minimum width M1 and the maximum width M2 of the margin portion are substantially the same and, in these comparative examples, deterioration occurred in the high temperature acceleration test and the humidity resistance test. In the case where the minimum width M1 of the margin portion is 30 μm or less, it was found that the cutting fault rate is rapidly increased.

On the other hand, in the case where the internal electrode has a predetermined radius of curvature R at the length directional center, for example, each of the samples Nos. 10 through 12 and 16 through 18 shows BDV properties higher than or substantially similar to the rectangular pattern. In addition, no deterioration in the high temperature acceleration test was observed.

In particular, in the case where the ratio (M2/L2) of the maximum width M2 of the margin portion to the minimum width L2 of the internal electrode ranges from 0.2 to 0.3 and the minimum width M1 of the margin portion is 30 μm or more, for example, each of the samples Nos. 10 through 12 and 16 through 18 neither undergoes cutting fault nor deterioration in the humidity resistance test.

The reason for the foregoing facts may be presumed that, if the ratio of M2/M1 increases, a lateral side extending in the length direction of an internal electrode does not overlap a lateral side of another internal electrode adjacent in the lamination direction and a distance between the length directional ends of the adjacent internal electrodes is increased. Specifically, it may be considered that, as M2 increases, structural defects at the interface between the internal electrode and the dielectric layer due to penetration of the plating solution are inhibited.

Further, for the samples Nos. 10 through 12 and 16 through 18 according to the present embodiment, BDV properties were improved without a considerable decrease in capacity and deterioration in the high temperature acceleration test and the humidity resistance test was not observed. Therefore, it can be seen that multilayer ceramic capacitors with high reliability and high capacity may be achieved.

The samples Nos. 13, 19, 24 and 29 exhibited reduced electrostatic capacity of 9% or more, compared to the samples Nos. 9, 14, 20 and 25, each of which has a rectangular pattern with the same minimum width M1 of the margin portion. With a precondition that the thickness of the dielectric layer is 0.65 μm after calcination, if any one (test sample) shows a reduction in electrostatic capacity of 9% or more, compared to the electrostatic capacity of each sample with a rectangular pattern having the same minimum width M1 of the margin portion, the test sample entails difficulties in production due to a great reduction in capacity, although it has excellent reliability.

Meanwhile, in the case where the M2/M1 is less than 0.2, for example, the samples Nos. 15, 21, 26 and 27 showed deterioration in the humidity resistance test, thus reducing reliability. On the other hand, if the M2/M1 exceeds 0.3, it can be understood that the samples are disadvantageous in view of electrostatic capacity, as described above. That is, when M2 increases, it may be considered that an area of the internal electrode facing in the lamination direction is decreased, which in turn, leads to a decrease in capacity.

Further, in the case where the minimum width M1 of the margin portion is 30 μm or less, for example, the samples Nos. 20 through 29 exhibited a rapid increase in the cutting fault rate, regardless of pattern of the internal electrode. In addition, it was observed that, as the width of the margin portion is reduced, deterioration in the humidity resistance test is rapidly increased. Specifically, it can be seen that, with a decrease in the minimum width M1 of the margin portion, the cutting fault rate was increased.

For the samples Nos. 30 through 50, it can be seen that results of the samples having the dielectric layer with a thickness of 0.45 μm are substantially the same as the samples having the dielectric layer with a thickness of 0.65 μm.

Consequently, according to the examples of the present invention, it can be identified that a multilayer ceramic capacitor with high reliability and various advantages such as enhanced BDV properties, high capacity, and no deterioration in the high temperature acceleration test and the humidity resistance test, may be achieved.

As set forth above, the multilayer ceramic capacitor according to the present invention may realize a decrease in the size and an increase in the capacity of the multilayer ceramic capacitor while improving reliability thereof.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor, comprising:
a multilayer body having a dielectric layer and an internal electrode layer, a thickness of the dielectric layer being 0.65 μm or less, wherein the internal electrode layer includes a first internal electrode overlapping a second internal electrode to form a cross-point,
wherein a ratio of M2 to L2 (M2/L2) ranges from 0.2 to 0.3,
wherein L2 represents a minimum width of the internal electrode layer at the ends thereof in the length direction, and M2 represents a width of a portion of a margin portion M of the dielectric layer corresponding to the ends of the internal electrode layer in the length direction, the margin portion M being defined as a portion of the dielectric layer on which the internal electrode layer does not exist in a width direction.

2. The multilayer ceramic capacitor of claim 1, wherein a width of the internal electrode layer gradually decreases from a center thereof towards both ends thereof in a length direction.

3. The multilayer ceramic capacitor of claim 1, wherein a thickness of the dielectric layer is 0.45 μm or less.

4. The multilayer ceramic capacitor of claim 1, wherein, when the width of the portion of the margin portion corresponding to the center of the internal electrode layer in the length direction, is defined as a minimum width M1, M1 exceeds 30 μm.

5. The multilayer ceramic capacitor of claim 1, wherein the center of the internal electrode layer in the length direction has a predetermined radius of curvature.

6. The multilayer ceramic capacitor of claim 1, wherein a lateral side of the internal electrode layer extending in the length direction has an elliptical shape.

7. The multilayer ceramic capacitor of claim 1, wherein the multilayer ceramic capacitor has a length and a width of 0.6±0.09 mm and 0.3±0.09 mm, respectively.

* * * * *